May 19, 1964  R. E. COUTANT ETAL  3,133,452
DRIVE MECHANISM
Filed July 21, 1961

Inventor:
Ralph E. Coutant,
James W. Clark,
by H. F. Manbeck Jr.
Attorney.

United States Patent Office 3,133,452
Patented May 19, 1964

3,133,452
DRIVE MECHANISM
Ralph E. Coutant, Wyckoff, and James W. Clark, Paterson, N.J., assignors to General Electric Company, a corporation of New York
Filed July 21, 1961, Ser. No. 125,743
7 Claims. (Cl. 74—421)

Our invention relates to drive mechanisms and more particularly to gear reduction mechanisms having a readily removable output shaft adapted to support the driven load.

In many applications requiring a gear reduction mechanism, the driven load is supported from the output shaft of the mechanism. One common application of this is in large industrial and commercial clothes dryers wherein the rotating drum is supported by the output shaft of a gear reducer which is itself supported by the structure of the clothes dryer. In these dryer applications, it is desirable that the rotating drum be removable and in order to provide this feature the gear reducer is so designed that the output shaft may be readily withdrawn from it. In other words, to remove the drum, the shaft and the drum are removed as a unit from the dryer.

To provide this removability feature for the output or drum shaft, the gear reducer is commonly provided with a hollow shaft which is rotatably mounted within the housing and which, in turn, carries the output shaft. The hollow shaft may be formed integral with the output gear of the reducer by appropriate hub extensions on each side of the gear, or it may be a separate hollow cylindrical piece which is keyed to the output gear. In either case, the resulting structure is redundant in the sense that it has two shafts. Since the inner shaft must be designed to carry the load, the outer or hollow shaft has an overabundance of capacity necessitating the use of oversize bearings, and imposing certain other disadvantages as follow.

If the hollow shaft is formed as an integral part of the output gear by extending a hub on each side, it is essential that the housing be split in a plane perpendicular to the axis of the output gear in order to assemble the unit. Such a split is undesirable since it introduces an oil leakage hazard. Also, it requires that each portion of the housing be bored separately or be assembled prior to boring and then disassembled for installation of the gear, and it introduces undesirable elements of cost in the machining of matching faces.

If the hollow shaft is a separate tubular member, then it must be provided with a keyway on its external surface to engage with the key of the driving gear, and a keyway on its internal surface to engage with the driven shaft. Thus, the cross-section must be unnecessarily thick necessitating the use of oversize bearings. Further, unless the tubular shaft is shouldered and the housing bores have staggered diameters, the housing must again be split in a plane perpendiuclar to the output gear to permit assembly.

Therefore, it is a principal object of our invention to provide an improved gear reduction mechanism which allows for easy removability of the output shaft but which does not include the disadvantages mentioned above. It is a more specific object of the invention to provide such a gear mechanism in which no intermediate driven member is interposed between the output gear and the driven shaft, and which includes only a single housing part without joints in a plane perpendicular to the output shaft and with aligned bearing surfaces that may be bored in a single operation.

Still another object of our invention is to provide such a gear reduction mechanism which is substantially lower in cost than the type of mechanism discussed above.

In carrying out our invention in one form thereof, we provide a drive mechanism including a housing having side and bottom walls which form a gear cavity. An input shaft extends into the gear cavity and an input gear is mounted on the shaft within the cavity. Spaced from the input shaft, the housing is provided with a pair of aligned bearing surfaces and a pair of rotatable sleeves are journaled on these surfaces, each sleeve being supported by one of the surfaces. The sleeves do not contact each other but rather the inboard ends of the sleeves are spaced apart a predetermined distance. Also included in the mechanism is a driven gear which mates with the input gear and is driven thereby. This driven gear is carried directly by the output shaft which is mounted within the sleeves and extends outwardly from the housing at one end for connection to a load. In order to transmit the driving force from the driven gear to the output shaft, a single keying means is disposed between the inboard ends of the sleeves and directly connects the driven gear to the output shaft. With this arrangement, the output gear is mounted directly on the output shaft and may be assembled into the housing without the need of a split in a plane perpendicular to the output shaft. Also, with this arrangement, the sleeves serve only as a journaling medium between the housing and output shaft and consequently may be made as light as desired. A secondary purpose of the sleeves is to retain the output gear in position when the output shaft is withdrawn.

Further aspects of our invention will become apparent hereinafter and the specification concludes with claims particularly pointing out and distinctly claiming the subject matter which we regard as our invention. The invention, however, both as to organization and method of operation, together with further objects and advantages thereof, may best be understood by reference to the following description taken in conjunction with the accompanying drawing in which:

Figure 3:
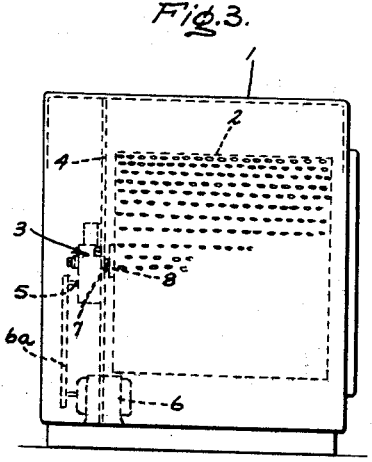
FIG. 3 is a side elevational view of a clothes dryer in which our drive mechanism is utilized to turn the clothes tumbling drum.

Referring now to the drawing, and in particular to FIG. 3, we have shown therein a clothes dryer 1 which includes a clothes tumbling drum 2 arranged for rotation about a horizontal axis. The tumbling drum 2 is driven by means of a drive mechanism 3 which is mounted on a vertical partition 4 disposed behind the tumbling drum. The input shaft 5 of the drive mechanism 3 is driven from a motor 6 through a suitable belt 6a, and the output shaft 7 of the mechanism drives the drum 2 directly. The output shaft 7, in fact, comprises the sole support for the drum, carrying it through a spider 8 provided at the rear end thereof, and when it is desired to remove the drum from the dryer housing for inspection, cleaning, etc., the spider and the output shaft 7 are removed as a unit. The manner in which the output shaft 7 may be removed from the mechanism 3 will be explained in detail hereinafter once the construction and arrangement of the mechanism have been explained, and it will be understood that the disclosed use of the mechanism in the clothes dryer is intended by way of illustration only since our mechanism may be used in any suitable drive application and is clearly not limited to use in clothes dryers.

Figure 1:
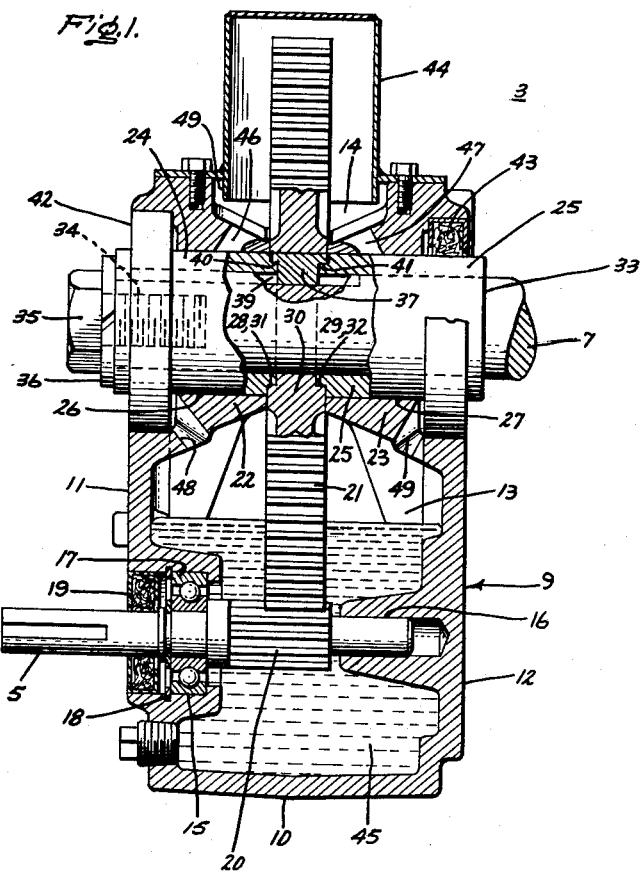
FIG. 1 is a cross-sectional view of an improved drive mechanism embodying our invention.

Referring now to FIG. 1 for a detailed explanation of our improved mechanism 3, it will be seen that the mechanism includes a one piece housing or casing generally indicated at 9. The one piece housing 9 includes a bottom wall 10 and side walls 11 and 12 as well as front and rear walls (not shown), and these walls cooperate to define an internal gear cavity 13. It will be especially noted that there is no transverse split in the housing member and as will be explained in detail hereinafter all of the moving parts are inserted into the cavity 13 either through certain shaft receiving apertures in the side walls or through an opening 14 provided at the top of the housing.

The input shaft 5 and the output shaft 7 are mounted on vertically spaced axes within the housing. The shaft 5, as shown, lies below the shaft 7 and it extends into the gear cavity 13 through a suitable aperture 15 provided in the left-hand side wall 11 of the housing. At its inboard end, the shaft 5 is journaled by means of a machined bearing surface 16 formed in a boss on the right hand side wall 12 of the housing, and at its other end the shaft 5 is journaled by means of a ball bearing assembly 17 which is mounted in the aperture 15. The ball bearing assembly is held in place against a flange of the aperture by means of a suitable snap ring arrangement 18, and an oil seal 19 is provided outwardly of the snap ring to close the aperture 15 and prevent lubricant leakage along the shaft 5. It will be noted that the aperture 15 even at its smallest diameter is considerably larger than the diameter of the shaft 5 or that of the input gear 20 which is mounted on the shaft. Thus, the shaft 5 and the gear 20 may be inserted into the housing through the opening 15 during the assembly of the drive mechanism.

The input gear 20 mates with and drives an output or driven gear 21 which is mounted on the output shaft 7. Specifically, the driven gear is mounted on the shaft 7 between a pair of elongated bosses 22 and 23 formed respectively on the side walls 11 and 12 of the housing. The separation between the inboard ends of these bosses is just slightly more than the thickness of the gear 21 and thus the gear is constrained from axial movement of the bosses.

Figure 2:
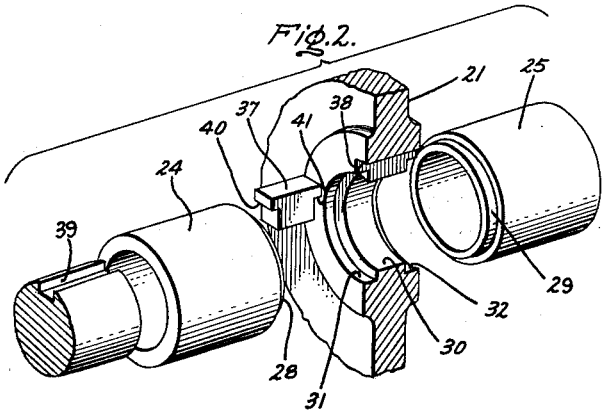
FIG. 2 is a fragmentary exploded view illustrating certain details of our invention as included in the improved drive mechanism.

The gear 21 drives the output shaft 7 through a keying means which will be explained hereinafter, and the arrangement of the driven gear relative to the output shaft forms an important aspect of our invention. As is shown in FIGS. 1 and 2, the output shaft 7 is mounted by means of a pair of rotatable sleeves 24 and 25. The sleeves or hollow shafts 24 and 25 are mounted in and journaled by suitable bearing surfaces 26 and 27 formed in the elongated bosses 22 and 23 on the housing walls. The sleeves 24 and 25 extend towards each other from the sides of the housing but they do not engage at the center of the gear cavity. Rather, their inboard or adjacent ends are spaced apart a predetermined distance.

In the illustrated embodiment each of the sleeves 24 and 25 includes a reduced diameter portion or shoulder at the inboard end thereof, the sleeve 24 including a shoulder 28 and the sleeve 25 including a shoulder 29. These shoulders 28 and 29 serve to pilot the driven gear 21 and to retain it centrally disposed with respect to the output shaft 7 when the latter is withdrawn. As is best shown in FIG. 2, the internal periphery or hub of the gear 21 includes a center flange 30 with shoulders 31 and 32 on either side of the flange. When the output shaft 7 is removed from the housing, the shoulders 31 and 32 rest respectively on the shoulders or lips 28 and 29 of the sleeves and thereby the gear 21 is retained in place until the shaft is reinserted. The flange 30 projects inwardly through space between the inboard ends of the sleeves and so mounts the gear 21 directly on the shaft 7 when the shaft 7 is in its normal position in the unit.

During operation of the unit the gear 21, the sleeves and the output shaft 7 all rotate together as a unit being held securely together. To accomplish this, the output shaft 7 is inserted into the sleeves 24 and 25 from the right side of the housing and when inserted, it extends completely through the housing to the outboard end of the left-hand sleeve 24. The shaft 7 includes a shoulder 33 of increased diameter immediately adjacent the outboard end of the right-hand sleeve 25 and when the shaft is in place, this shoulder engages the end of sleeve 25. At the left-hand end, the shaft is provided with a tapped recess 34 and a releasable clamping means for the shaft comprising a bolt 35 is threaded into this recess. A thrust washer 36 is located between the head of the bolt and the left-hand end of the sleeve 24 and when the bolt is tightened down, the sleeves 24 and 25 are pulled toward each other between the washer 26 and the shaft shoulder 33. The inboard ends of the sleeves engage the flange 30 of the driven gear 21 so that they remain spaced apart after the tightening of the bolt is completed, and, in effect, the tightening of the bolt clamps the sleeves, the driven gear 21 and the output shaft 7 firmly together.

In accordance with our invention, however, the driving force or torque is not transmitted from the gear 21 to the shaft 7 primarily through the sleeves 24 and 25 and the clamping means. Rather, it is transmitted thereto by a single keying means which engages the gear 21 at its outer end and the shaft 7 at its inner end. In addition to functioning as a pilot to hold the gear 21 in position when the output shaft 7 is removed, the sleeves 24 and 25, in the illustrated embodiment, also function to capture this single keying means so that it will not fall out when the output shaft is removed.

As is best shown in FIG. 2, the keying means comprises a generally T shaped key 37 which fits into a slot 38 in the gear 21 at its outer end and mates with a keyway 39 in the shaft 7 at its inner end. The slot 38 comprises an interruption in the flange 30, and located in this slot the key 37 extends through the space between the inboard ends of the sleeves into the keyway 39. This may be best seen in FIG. 1. It will be noted that the keyway 39 extends from slightly to the right of the keying area all the way to the left-hand end of the shaft so that the shaft may be withdrawn from the sleeves without interference by the key 37. It will also be noted that when the key is in position, the shoulders or wings 40 and 41 on key 37 fit over the shoulders 28 and 29 on the inboard end of the sleeves. Thus, the key is retained or trapped in place even when the shaft 7 is withdrawn. In other words, the mating between the shoulders 28 and 29 of the sleeves and the wings 40 and 41 of the key hold the key in position even when the shaft is withdrawn. Thus, it will be evident that the key 37 provides a direct drive between the gear 21 and the output shaft 7, and that this drive arrangement is such that the shaft may be withdrawn from the sleeves and replaced therein without disturbing any of the mechanism parts including the gear 21, the sleeves 24 and 25 and the key 37 itself.

To withdraw the shaft 7 from the mechanism, all that needs to be done is to remove the bolt 35 from the tapped hole 34 in the shaft. The shaft may then be readily slid out of the sleeves with no interference being provided by any other parts including the sleeves, the output gear or the key. The shaft may be reinserted at any time and secured back in place by means of the bolt and thrust washer. The sleeves being mounted on the relatively long bearing surfaces 26 and 27 do not tilt or cock when the shaft is withdrawn and thereby retain the key and driven gear 21 in position. It will be noted that lubricant seals 42 and 43 are provided around the sleeves outwardly of the bearing surfaces, and these oil seals are not disturbed by the removal or replacement of the shaft 7.

As poined out above, an important advantage of our drive mechanism is that its arrangement allows the utilization of a one-piece housing such as the housing 9. In our arrangement, all the parts may be assembled in the housing without any need to split the housing transversely into two parts. In the assembly process, the input shaft 5 is inserted through the aperture 15 and then the bearing 17 and the oil seal 19 are put in place as mentioned above. To assemble the upper or output portion of the mechanism, the driven gear 21 is first inserted through the aperture 14 at the top of the housing. The sleeves 24 and 25 are then inserted along the bearing surfaces 26 and 27 until the shoulders at the inboard ends of the sleeves mate with the flange 30 of the input gear thereby supporting the input gear. The key 37 is, of course, positioned in slot 38 of the gear so that it is trapped in place by the shoulders 28 and 29 on the sleeves as they are brought against the flange 28. It will be understood that the gear 21 is positioned with the slot 38 at the bottom of its rotative path rather than at the top as illustrated in the drawing, so that the key will not fall out before the sleeves are brought together with flange 30. Once the sleeves are supporting the gear and holding the key in place, the shaft 7 is then inserted into the sleeves and clamped in place by means of clamping means comprising the bolt 35, the thrust washer 36 and the clamping shoulder 33 on the shaft. The oil seals 42 and 43 are, of course, inserted at any appropriate time either before or after the bearing sleeves.

The one piece housing 9, besides eliminating the sealing problems encountered with two part transversely split housings, also allows the bearing surfaces 26 and 27 to be machined in a single boring operation. This is quite advantageous in the manufacturing process as contrasted to a housing in which two halves have to be assembled prior to boring and then disassembled again in order to install the gears. Also, there are no matching faces in the housing requiring machining whereby a cost factor is eliminated. Another advantage of our arrangement is that the cross section of the sleeves may be kept to a minimum. Since there is no need to cut two keyways in the sleeves, one in the outer surface and one in the inner surface, the cross section can be appreciably reduced as contrasted to previous mechanisms in which the keying function is accomplished in the sleeve itself.

Once the assembly of the unit is completed, a simple cover 44 is then placed over the aperture 14 to prevent lubricant from being thrown out of the unit by the gear 21 during rotation. It will be noted that in the illustrated embodiment a pool of lubricant or oil 45 is provided in the bottom part of the bearing cavity 13. This lubricant pool lubricates the gears 20 and 21 directly and also, of course, lubricates the bearing surfaces for the input shaft 5. The bearing surfaces 26 and 27 are splash lubricated from the gear 21, the oil dropping from the gear flowing downwardly onto the bearing surfaces through the ports 46 and 47 and then returning to the pool through the lower ports 48 and 49. The shaft seals 19, 42 and 43, of course, prevent lubricant from escaping around from the housing around the shafts, and since there are no other openings for oil leakage the housing is made leak proof without any expensive machining or gasketing operation between housing parts. The depending flange 49 on the cover effectively prevents the oil from reaching the surfaces at which it engages the housing.

While in accordance with the Patent Statutes we have described what at present is considered to be the preferred embodiment of our invention, it will be obvious to those skilled in the art that various changes and modifications may be made therein without departing from the invention and it is, therefore, aimed in the appended claims to cover all such equivalent variations as fall within the true spirit and scope of the invention.

What we claim as new and desire to secure by Letters Patent of the United States is:

1. In a drive mechanism, a housing having a pair of aligned bearing means, a pair of rotatable sleeves each supported by one of said bearing means, with the inboard ends of said sleeves being spaced apart a predetermined distance, a shaft mounted within and supported by said sleeves and extending outwardly on at least one end thereof, a rotatable member disposed around said sleeves and said shaft and normally carried by said shaft, interengaging means on said sleeves and said rotatable member for supporting said rotatable member by said sleeves when said shaft is removed from said mechanism, and keying means disposed between said inboard ends of said sleeves and keying said rotatable member to said shaft, whereby a direct driving connection is formed between said rotatable member and said shaft, with said shaft being removable from said mechanism without disturbing said rotatable member, said sleeves or said keying means.

2. In a drive mechanism, a housing having a pair of aligned bearing means, a pair of rotatable sleeves each supported by one of said bearing means, with the inboard ends of said sleeves being spaced apart a predetermined distance, a shaft mounted within and supported by said sleeves and extending outwardly on at least one end thereof, a rotatable member disposed around said sleeves and said shaft and having a flange extending between the inboard ends of said sleeves for normally mounting said rotatable member on said shaft, inter-engaging means on said sleeves and said rotatable member for supporting said rotatable member by said sleeves when said shaft is removed from said mechanism, a slot in said flange of said rotatable member, and keying means positioned in said slot between said inboard ends of said sleeves and keying said rotatable member to said shaft, whereby a direct driving connection is formed between said rotatable member and said shaft with said shaft being removable from said mechanism without disturbing said rotatable member, said sleeves or said keying means.

3. In a drive mechanism, a housing having a pair of aligned bearing means, a pair of rotatable sleeves each supported by one of said bearing means, with the adjacent inboard ends of said sleeves being spaced apart a predetermined distance, each of said inboard ends having a shoulder of reduced diameter formed thereon, a shaft mounted within and supported by said sleeves and extending outwardly from said housing at one end thereof, a rotatable member disposed around said sleeves and said shaft and having an internal flange positioned between the inboard ends of said sleeves and engaging said shaft to mount said gear normally on said shaft, said rotatable member further including a pair of shoulders overlying said shoulders of said sleeves for supporting said gear when said shaft is withdrawn from said mechanism, a slot formed in said flange of said rotatable member, a keyway formed in said shaft, and a drive key disposed between said inboard ends of said sleeves and fitting into said slot in said rotatable member and said keyway in said shaft thereby to form a direct driving connection between said rotatable member and said shaft, said key having a pair of shoulders thereon overlying said shoulders of said sleeves, whereby said key is retained in place between said sleeves and in engagement with said rotatable member when said shaft is withdrawn from said mechanism.

4. The mechanism of claim 3 including means for normally securing said shaft and said rotatable member to said sleeves, comprising shoulder means formed on said shaft outboard of one of said sleeves, and a releasable clamping means mounted on the opposite end of said shaft, outboard of the other of said sleeves, said shoulder means and said clamping means respectively engaging the outboard ends of said sleeves and pulling said sleeves toward each other, thereby to releasably secure said shaft to said sleeves and said flange between said sleeves.

5. In a drive mechanism, a housing having side and bottom walls forming a gear cavity, an input shaft extending into said cavity, an input gear mounted on said shaft within said cavity, a pair of aligned bearing surfaces formed on said side walls of said housing and spaced from said input shaft, a pair of rotatable sleeves each journaled on one of said bearing surfaces and with the inboard ends of said sleeves being spaced apart a predetermined distance, an output shaft mounted within and supported by said sleeves and extending outwardly from said housing at one end thereof for connection to a load, a driven gear disposed around said sleeves and said output shaft and normally carried by said output shaft, said driven gear mating with said input gear for actuation thereby, interengaging means on said sleeves and said driven gear for supporting said driven gear by said sleeves when said shaft is removed from said mechanism, and keying means disposed between said inboard ends of said sleeves and keying said driven gear to said output shaft, whereby a direct driving connection is formed between said driven gear and said output shaft with said output shaft being removable from said mechanism without disturbing said input shaft, said gears, said sleeves or said keying means.

6. In a drive mechanism, a housing having side and bottom walls forming a gear cavity, an input shaft extending into said cavity, an input gear mounted on said shaft within said cavity, a pair of aligned bearing surfaces formed on said side walls of said housing and spaced from said input shaft, a pair of rotatable sleeves each journaled on one of said bearing surfaces, with the inboard ends of said sleeves being spaced apart a predetermined distance, each of said inboard ends having a shoulder of reduced diameter formed thereon, an output shaft mounted within and supported by said sleeves and extending outwardly from said housing at one end for connection to a load, a driven gear disposed around said sleeves and said output shaft, and having an internal flange located between said inboard ends of said sleeves and engaging said output shaft to mount said driven gear normally on said output shaft, said driven gear engaging said input gear for actuation thereby, said driven gear further including a pair of shoulders overlying said shoulders of said sleeves for supporting said driven gear when said output shaft is withdrawn from said mechanism, a slot formed in said flange of said driven gear, a keyway formed in said output shaft, and a drive key disposed between said sleeves and fitting into said slot in said driven gear and said keyway in said output shaft thereby to form a direct driving connection between said driven gear and said shaft, and said key having a pair of shoulders thereon overlying said shoulders of said sleeves where said key is retained in place between said sleeves and in engagement with said driven gear when said output shaft is withdrawn from said mechanism.

7. The drive mechanism of claim 6 including means for normally securing said output shaft and said driven gear to said sleeves, comprising shoulder means formed on the output portion of said output shaft extending outwardly of said housing and a releasable clamping means formed on the end of said shaft opposite said output portion, said shoulder means and said clamping means respectively engaging the outboard ends of said sleeves thereby to releasably secure said output shaft to said sleeves and said flange between said sleeves.

References Cited in the file of this patent

UNITED STATES PATENTS

| | | |
|---|---|---|
| 2,089,410 | Olson | Aug. 10, 1937 |
| 2,952,165 | Bade | Sept. 13, 1960 |